United States Patent [19]
Chow et al.

[11] 3,852,164
[45] Dec. 3, 1974

[54] PURIFICATION OF 1,4-BUTANEDIOL BY VACUUM DISTILLATION WITH SIDE STREAM RECOVERY

[76] Inventors: Sidney Hsin Huai Chow, 4118 Bayon Grove Dr.; James Daniel Verbsky, 103 Whispering Oaks Dr., both of Seabrook, Tex. 77586

[22] Filed: Mar. 30, 1973

[21] Appl. No.: 346,675

[52] U.S. Cl. ............ 203/91, 203/18, 203/99, 203/DIG. 19, 260/637 R
[51] Int. Cl. .................... B01d 3/10, C07c 29/26
[58] Field of Search .......... 203/18, 99, 91; 202/153; 260/637 R

[56] References Cited
UNITED STATES PATENTS

| | | | |
|---|---|---|---|
| 2,768,214 | 10/1956 | McKinley et al. | 260/637 R |
| 3,408,265 | 10/1968 | Ward | 203/99 |
| 3,530,043 | 9/1970 | Horn et al. | 203/99 |
| 3,692,636 | 9/1972 | Huguet | 203/99 |
| 3,713,991 | 1/1973 | Thomas | 203/99 |

*Primary Examiner*—Wilbur L. Bascomb, Jr.

[57] ABSTRACT

Substantially pure 1,4-butanediol is recovered as a side stream with very low water content by vacuum distillation with water and low boiling impurities taken off overhead and high boiling organic tars and inorganic salts taken off in a liquid bottoms stream.

6 Claims, 1 Drawing Figure

PATENTED DEC 3 1974 3,852,164
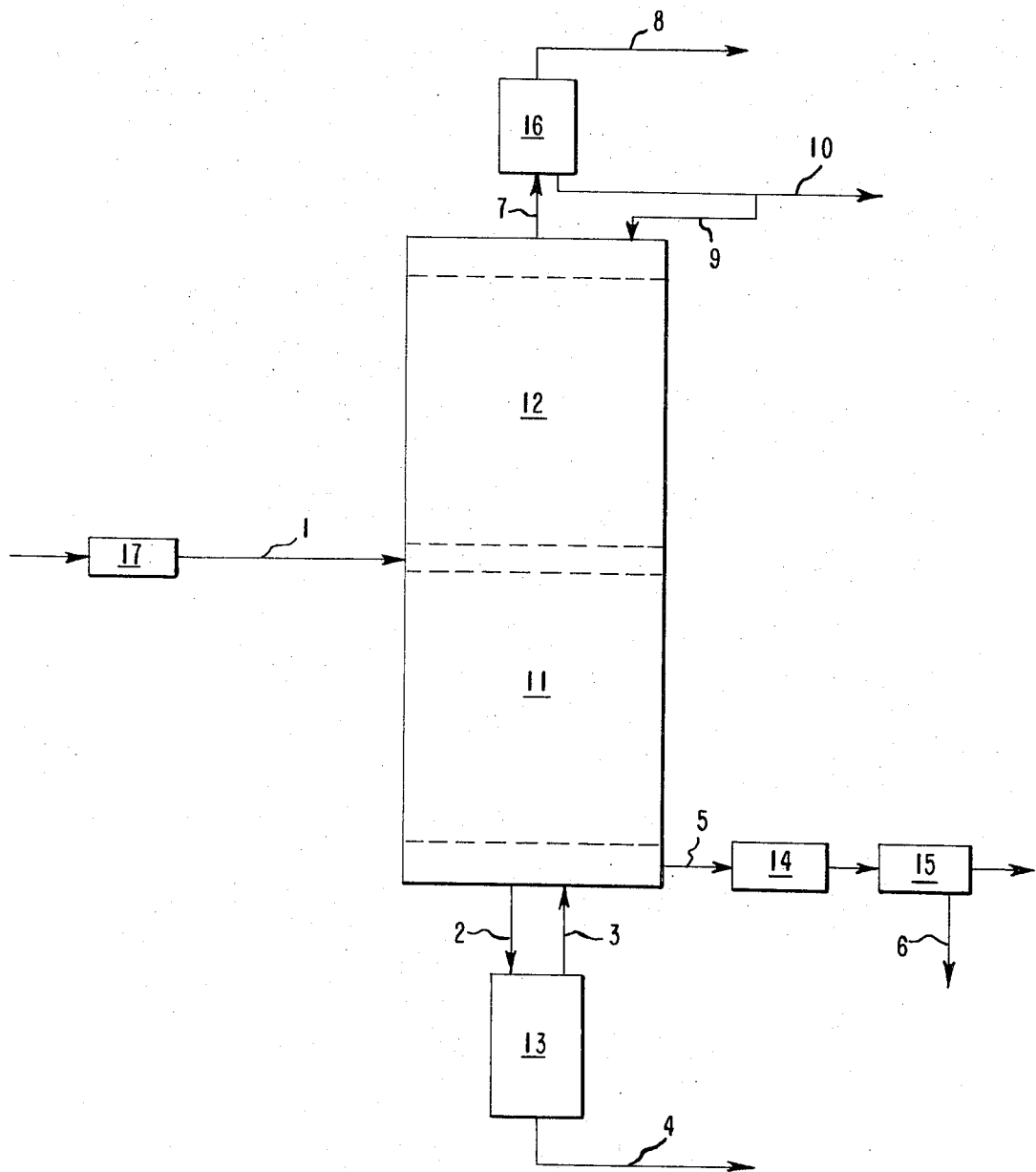

3,852,164

PURIFICATION OF 1,4-BUTANEDIOL BY VACUUM DISTILLATION WITH SIDE STREAM RECOVERY

BACKGROUND OF THE INVENTION

This invention relates to a process for purifying 1,4-butanediol. More particularly, it relates to such a process using vacuum distillation.

It is desirable to be able to produce 1,4-butanediol with a minimum of water content for various uses such as in the manufacture of certain textile fibers. However, conventional multi-stage distillation procedures inherently produce a certain amount of water plus tetrahydrofuran by the breaking down of 1,4-butanediol at elevated temperatures. The prior art generally does not produce 1,4-butanediol containing less than about 0.2% by weight water, and frequently the water content is much higher.

One procedure used for the refinement of 1,4-butanediol is discussed in German Pat. application OS No. 2,055,892, published May 25, 1972, which shows the use of several columns in certain combinations. It would be much more desirable and economical if a single column process could be used to obtain equivalent or superior results.

U.S. Pat. No. 2,686,818 — Copes, et al., issued Aug. 17, 1954 describes a process for reacting tetrahydrofuran and water in the presence of a catalyst at elevated pressure, and then lowering the pressure in the lower portion of the same column and separating liquid butanediol from the remaining tetrahydrofuran and water by distillation. Tetrahydrofuran is generally more costly than butanediol and therefore is not a desirable starting ingredient for the production of butanediol. Also, the operation of such a process, wherein liquid butanediol is separated from the tetrahydrofuran and water in a separate condenser under conditions which do not lead to the maximum purification of the butanediol, is not the most commercially desirable approach.

SUMMARY OF THE INVENTION

The present invention, in certain of its embodiments, provides a method of recovering 1,4-butanediol containing a minimum of water from a crude mixture containing 1 to 20% water and low boiling organic impurities, 80 to 99% 1,4-butanediol and 0.05 to 5% combined high boiling organic tars and inorganic salts, which method comprises passing the crude mixture to a distillation column operating at subatmospheric pressure and adapted with a reboiler which can be external to the column, withdrawing the overhead and returning a portion of the overhead as reflux, passing the bottoms to the reboiler, withdrawing liquid from the bottom of the reboiler, passing vapor from the reboiler to the bottom of the distillation column, and withdrawing a portion of the vapor passing from the reboiler to the vacuum distillation column as substantially pure 1,4-butanediol.

Preferably, the absolute pressure in the distillation column is under about 200 millimeters of mercury and an optimum condition has the top of the column at a pressure of 100 millimeters of mercury. When operating properly, the process can produce 1,4-butanediol containing less than about 0.1% by weight of water.

DESCRIPTION OF THE DRAWING

The sole FIGURE of the drawing is a schematic flow diagram of equipment for operating the process of the invention.

DETAILED DESCRIPTION OF THE PREFERRED EMBODIMENTS

The present invention utilizes a single distillation tower to separate 1,4-butanediol from low boiling organic impurities and water as overheads and from organic tars and inorganic salts as bottoms. Tetrahydrofuran produced by decomposition of the 1,4-butanediol exits the column as overhead.

In contrast to prior art processes in which 1,4-butanediol was taken overhead in the final steps of a multiple distillation process, the 1,4-butanediol is not taken overhead in this process. It has been found that crude butanediol, when heated, tends to break down into water plus tetrahydrofuran. Also, subatmospheric pressures are used in the present invention to permit the use of lower distillation temperatures. This too minimizes the decomposition of the butanediol. Preferably, absolute pressures in the distillation column are kept below about 200 mm of mercury. A desirable pressure level is about 100 mm Hg at the top of the column and 120 mm Hg at the bottom.

Any appropriate conventional type of distillation column could be used. In one preferred embodiment, a tower packed with stainless steel pall rings equivalent to 12 to 14 theoretical plates is used. A tower with actual plates or other types of packing could also be used in other preferred embodiments.

Turning now to the drawing, it will be seen that the crude butanediol enters through line 1 a tower which has an upper half 12 and a lower half 11. The crude has been heated in preheater 17. Each half, 11 and 12, is packed with stainless steel pall rings, and the two halves are preferably separated, such as by perforated metal plates or screens. Although the halves can be of about equal size, it also can be preferable for the packed depth below the inlet to be somewhat larger than that above the inlet, depending on the particular needs to be met.

The overhead stream is taken through overhead condenser 16 by way of line 7. A vacuum is applied to the system through line 8. Part of the overhead stream of low boiling organic impurities and water is removed by line 10, and the rest is returned to the upper half 12 of the distillation column by line 9. The proportions between lines 9 and 10 can be adjusted to affect the process and the product produced.

From the bottom half 11 of the distillation column, a bottoms stream is taken by line 2 to reboiler 13. A bottom purge is removed by line 4 to eliminate undesirable materials, including a liquid stream of organic tars and inorganic salts. Through line 3 a vapor stream of purified 1,4-butanediol passes back to bottom half 11 of the distillation column.

Somewhere in the bottom half 11 of the distillation column, line 5 removes purified 1,4-butanediol from the column. The vapor is taken through vapor entrainment separator 14 and condenser 15 to side draw product line 6. Vacuum is maintained on this part of the system through another line shown on condenser 15.

The location of line 5 within bottom half 11 of the distillation column is a matter of choice. Preferably it is at a height lower than the first two or three theoretical plates. By positioning line 5 above the very bottom of the distillation column, some extra demisting and separating of high boiling impurities from 1,4-butanediol is assured.

An operating example of the invention can be seen in the following table for a side draw product design rate of about 300 pounds per hour. In the table, BAD means 1,4-butanediol, and OH means overhead.

FLOWSHEET

| Stream Description | Stream No. | lbs./hr. | Temp., °C. | Pressure mm Hg | Density lbs./cu.ft. | COMPOSITION WEIGHT PERCENT | | | | |
|---|---|---|---|---|---|---|---|---|---|---|
| | | | | | | BAD | $H_2O$ | Low Boilers | High Boilers | Tar & Salts |
| Column Feed | 1 | 500 | 130 | 110 | 58.02 | 93.09 | 5.0 | 0.17 | 0.24 | 1.50 |
| Liquid to Reboiler | 2 | 927.8 | 177.8 | 129.2 | 55.12 | | | | | |
| Vapor from Reboiler | 3 | 842.4 | 180.0 | 131.4 | 0.026 | | | | | |
| Bottom Purge | 4 | 85.4 | 180.0 | 131.4 | 57.03 | 90.59 | — | — | 0.63 | 8.78 |
| Side Draw Vapor | 5 | 300 | 177.8 | 129.2 | 0.026 | | | | | |
| Side Draw Product | 6 | 300 | 50.0 | 760.0 | 63.4 | 99.66 | 0.07 | 0.05 | 0.22 | — |
| Vapor to O.H. Condenser | 7 | 368.6 | 152.0 | 90.0 | 0.012 | | | | | |
| O.H. condenser Vent | 8 | 13 | 68.0 | 90.0 | 0.005 | 2.77 | 95.85 | 1.38 | — | — |
| Reflux | 9 | 254 | 68.0 | 90.0 | 60.33 | | | | | |
| O.H. Take Off | 10 | 101.6 | 68.0 | 90.0 | 60.33 | 87.35 | 12.14 | 0.51 | — | — |

What is claimed is:

1. A process of recovering 1,4-butanediol containing a minimum of water from a crude mixture containing, by weight, 1 to 20% water plus low boiling organic impurities, 80 to 99% 1,4-butanediol, and 0.05 to 5% combined high boiling organic tars and inorganic salts, which method comprises passing the crude mixture to a distillation column operating at subatmospheric pressure and adapted with a reboiler, withdrawing the overhead, passing the bottoms to the reboiler, withdrawing liquid from the reboiler, passing vapor from the reboiler to the bottom of the distillation column, and withdrawing vapor from the bottom portion of the distillation column as substantially pure 1,4-butanediol.

2. The process of claim 1 in which a portion of the overhead is returned to the distillation column as reflux.

3. The process of claim 1 in which the vapor withdrawn from the bottom portion of the distillation column is a portion of the vapor produced by the reboiler.

4. The process of claim 1 in which the distillation column is operated at an absolute pressure under about 200 millimeters of mercury.

5. The process of claim 1 in which the distillation column is operated at an absolute pressure of about 100 millimeters of mercury.

6. The process of claim 1 in which the recovered 1,4-butanediol contains less than about 0.1% by weight of water.

* * * * *